United States Patent [19]

Zorzini

[11] Patent Number: 5,732,844
[45] Date of Patent: Mar. 31, 1998

[54] SAFETY HATCH FOR TANKS, WASHING MACHINES AND INDUSTRIAL MACHINES AND PLANTS IN GENERAL

[75] Inventor: Franco Zorzini, Paparotti-Udine, Italy

[73] Assignee: Zorzini Srl, Italy

[21] Appl. No.: 667,454

[22] Filed: Jun. 21, 1996

[30] Foreign Application Priority Data

Jul. 3, 1995 [IT] Italy .................. UD95A0133

[51] Int. Cl.$^6$ .................................. B65D 45/24
[52] U.S. Cl. .............. 220/325; 292/256.73; 292/256.5; 105/377.11; 220/327
[58] Field of Search ..................... 220/315, 324, 220/325, 327, 328, 334, 343, 203.04, 366.1, 89.1; 292/256, 256.5, 256.71, 256.73, 256.75, DIG. 65; 105/377.11, 377.07, 377.05, 377.01

[56] References Cited

U.S. PATENT DOCUMENTS

| | | | |
|---|---|---|---|
| 1,234,133 | 7/1917 | Cole | 292/256.75 |
| 1,478,218 | 12/1923 | Hamblin | 292/256.75 |
| 2,113,776 | 4/1938 | Smith | 292/256.75 X |
| 3,664,700 | 5/1972 | Pickard | 292/256.75 |
| 3,756,640 | 9/1973 | Johnson | 292/256.75 |
| 3,786,955 | 1/1974 | Mowatt-Larssen | 292/256.75 X |
| 3,907,157 | 9/1975 | Beattie | 220/327 |
| 4,877,364 | 10/1989 | Sorrentino . | |
| 5,489,132 | 2/1996 | Schneider | 292/256.75 |

FOREIGN PATENT DOCUMENTS

| | | | |
|---|---|---|---|
| 1137116 | 5/1957 | France . | |
| 2583390 | 12/1986 | France | 220/327 |
| 15931 | 7/1910 | United Kingdom . | |
| 1236209 | 6/1971 | United Kingdom | 292/256.75 |

Primary Examiner—Gary E. Elkins
Assistant Examiner—Nathan Newhouse
Attorney, Agent, or Firm—Adams & Wilks

[57] ABSTRACT

A safety hatch for tanks, washing machines, industrial machines and the like comprises a frame and an arm having a first end pivotally connected to the frame. A second end of the arm has a surface portion provided with a hole having a circular section communicating with a slot section which extends to an external edge of the arm. A male threaded member is dimensioned to extend through the arm hole and has a first end pivotally connected to the frame and a second end. A female threaded member is adapted for threaded engagement with the male threaded member and has a head section and a shank section. A clamping member is integrally connected to the shank section of the female threaded member and has a tubular portion extending from the shank section. A fastener limits the displacement of the female threaded member along a predetermined axial length of the male threaded member, the tubular portion of the clamping member having a length greater than at least the predetermined axial length of the male threaded member.

30 Claims, 2 Drawing Sheets

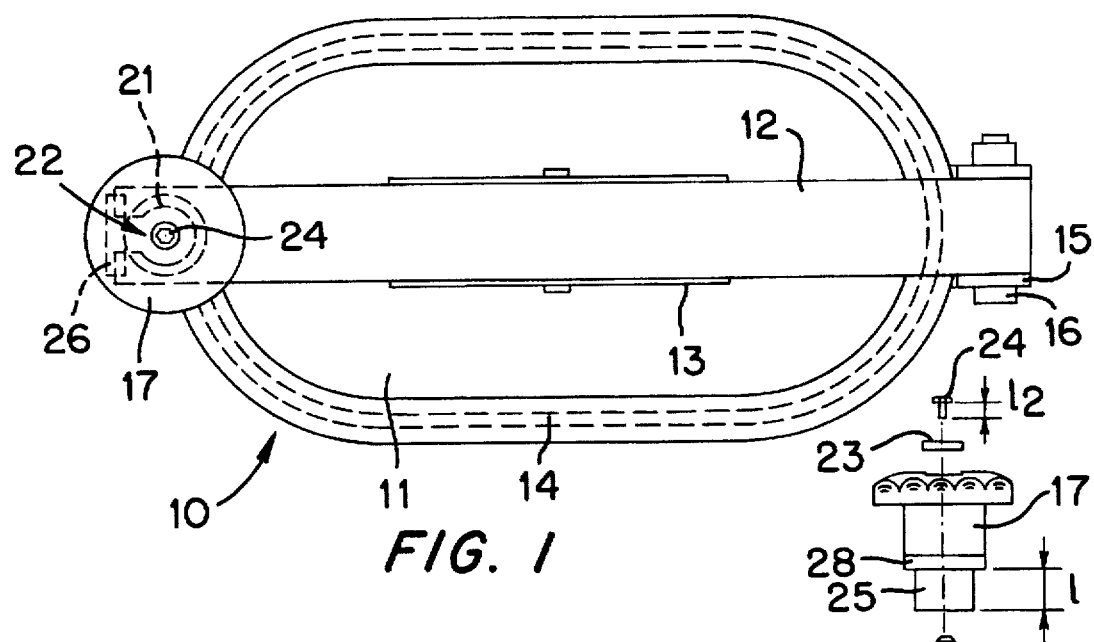
FIG. 1
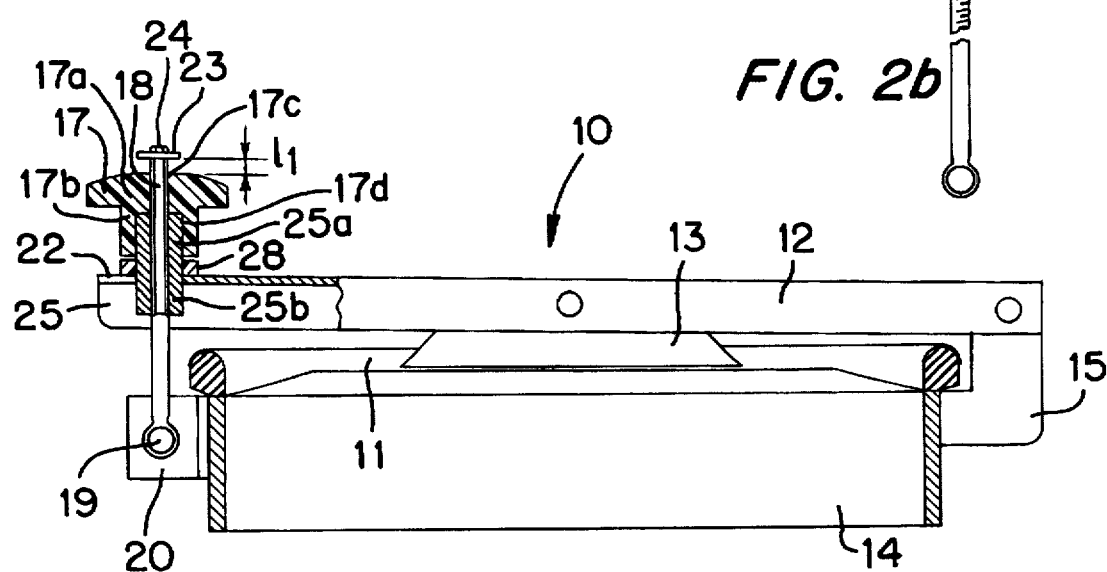
FIG. 2b
FIG. 2a

SAFETY HATCH FOR TANKS, WASHING MACHINES AND INDUSTRIAL MACHINES AND PLANTS IN GENERAL

FIELD OF THE INVENTION

This invention concerns a safety hatch for tanks, washing machines and industrial machines and plants in general, as set forth in the main claim.

In particular, this invention is applied to the field of industrial washing plants and, more specifically, to the field of plants for washing containers of foodstuffs products for re-use, such as, in particular, bottles, trays or other means.

BACKGROUND OF THE INVENTION

It is known that one of the main problems in the field of industrial washing or in the management and control of tanks and industrial plants in general concerns the emptying of the liquid when the working cycle of those machines has ended.

For instance, the common process carried out by those engaged in the activity of industrial washing includes a preliminary partial opening of the hatch to allow the outflow of the washing liquid thrust by the pressure within the washing machine.

Then the machine operator opens the hatch fully to complete the discharge of the liquid and when appropriate to withdraw the washed objects and also to make the machine ready again for the next washing cycle.

The washing liquids normally used generally contain substances which are very dangerous and harmful for the safety of the machine operator.

Even where such harmful substances are not present, the very high temperatures and pressures of the washing liquid likewise make the liquid very dangerous for the machine operator.

However, in view of the highly repetitious nature of the operations, the great number of machines which one single operator often has to keep under control and the very high working speeds, it often happens that the operator does not pay due attention and opens the hatch without taking into account the high pressure of the liquid contained therein.

The liquid thus tends to thrust the hatch to the maximum opening position and this situation is the source of great risks for the operator, who may be splashed by the liquid and by the toxic and harmful substances possibly contained therein.

The documents GB-A-15,931 and FR-A-1.137.116 illustrate hatches for tanks or similar containers in which the outwardly threaded pin onto which the opening knob is screwed has at the top a bolt which prevents complete withdrawal, unless the bolt itself is removed.

This however does not constitute an obstacle to the complete opening of the hatch, as the positioning eyelet of the outwardly threaded pin is open at the side and therefore prevents any interference of the knob by tilting it towards the outside after it has been loosened to a certain extent, and then the hatch may be opened.

The thrust of the liquid present inside the tank may itself cause the outwardly threaded pin to be tilted, and therefore cause the hatch to open, involuntarily and unforeseen by the operator, after the knob has been partially loosened.

SUMMARY OF THE INVENTION

The present invention has been designed, tested and embodied to overcome this serious shortcoming, which has been the source of complaints by operators in this field for some time now, and to provide a simple, practical, reliable and very functional solution.

This invention is set forth and characterized in the appended claims which describe variants of the idea of the main embodiment.

The purpose of the invention is to provide a hatch for tanks washing machines, industrial machines and plants in general, which provides safety features able to prevent sudden and heavy discharges of liquid of a type entailing dangers for the machine operator.

The safety hatch conventionally includes opening and closure means including an inwardly threaded knob associated with an outwardly threaded pin.

This threaded pin cooperates with a substantially circular seating, which normally consists of a through hole machined in an arm solidly associated or integral with the hatch.

In one embodiment of the invention, this substantially circular seating is open at one side to enable the outwardly threaded pin and therefore the inwardly threaded knob associated therewith to be released sideways and thus to enable the hatch to be fully opened.

The outwardly threaded pin passes through the inwardly threaded knob and is closed at its upper end by removable closure means.

The threaded knob can carry out only a limited travel in the direction of the opening of the hatch since its complete withdrawal is momentarily prevented by the closure means.

In order to release the threaded knob, it is necessary to remove the closure means by hand with an appropriate operation and then to complete the removal of the threaded knob by unscrewing it.

According to the invention, the lateral opening which makes possible the release of the threaded pin and threaded knob from the hatch has a width smaller than the diameter of the substantially circular seating.

In a first embodiment of the invention, the threaded knob includes a clamping ring positioned below its own engagement means and solidly associated with them; this clamping ring has a diameter which substantially coincides with the diameter of the circular seating portion and therefore is greater than said lateral opening.

The clamping ring is at least equal in length to the sum of the distance travelled by the inwardly threaded knob as far as the closure means and the unscrewing distance of the closure means themselves, plus a safety margin.

This acts as a safeguard against any accidental opening of the hatch unless the closure means placed at the end of the threaded pin is not deliberately removed.

In fact, since the hatch at the moment of its opening is thrust against the threaded knob, while the latter is being unscrewed, by the pressure of the liquid contained in the washing machine, the threaded knob and threaded pin cannot be released sideways because the clamping ring has a dimension greater than the lateral opening.

The lateral release of the threaded knob and of the threaded pin and therefore the complete opening of the hatch are only made possible by removing the closure means from the end of the threaded pin and by unscrewing still further the threaded knob until the interference between the clamping ring and the lateral opening of the circular seating is eliminated.

This allows the threaded pin to be released laterally while the threaded knob is kept fixed at its end.

This solution provides absolute assurance for the machine operator, who therefore has to cause, of his own free will, the complete opening of the hatch by removing the closure means from the end of the threaded pin.

According to a first variant, so as to provide an assurance of still greater safety, the lateral opening is blocked by temporary removable closure elements which the machine operator has to remove before releasing the threaded knob and threaded pin laterally.

According to another variant, the lateral opening is blocked by a stationary closure element solidly connected to the arm associated with the hatch.

According to another variant, there is no lateral opening and the through hole on the arm is a closed hole.

In these last two cases, so as to make possible the complete opening of the hatch after the partial opening step and therefore after discharge of the liquid, it is necessary to remove the closure means associated with the top of the threaded pin and then to release the threaded knob completely from the threaded pin.

It is only at this stage that the hatch is no longer clamped and can be brought to the fully opened position.

BRIEF DESCRIPTION OF THE DRAWING

The attached figures are given as a non-restrictive example and show some preferred embodiments of the invention as follows:

FIG. 1 is a plan view of a first embodiment of the safety hatch according to the invention;

FIG. 2a shows a longitudinal section of the hatch of FIG. 1;

FIG. 2b shows an exploded detail of FIG. 2a;

FIG. 2c shows a variant detail of FIG. 2a;

DETAILED DESCRIPTION OF THE PREFERRED EMBODIMENTS

Figure 3:
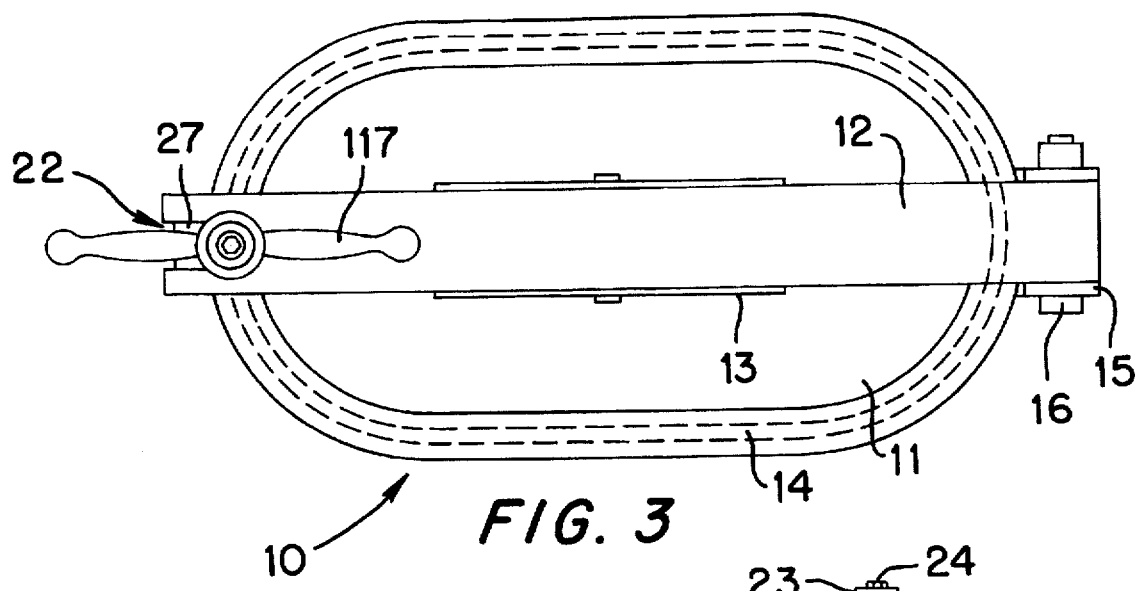
FIG. 3 is a plan view of a variant of FIG. 1.

The safety hatch 10 shown in FIG. 1 is normally applied to tanks and industrial washing plants or machines.

The hatch 10 comprises a plate 11 solidly associated or integrally connected with an arm 12 by means of a first connecting bracket 13.

The arm 12 is pivoted at one side of a frame 14 of the hatch 10 by means of a second connecting bracket 15 and a first pivot 16.

The means to open and close the plate 11 in relation to the frame 14 comprises a female threaded member or an inwardly threaded knob 17 associated with a male threaded member or an outwardly threaded pin 18.

The threaded pin 18 is fitted so as to be able to oscillate on a second pivot 19 installed in a third bracket 20.

The arm 12 contains a hole which defines a substantially circular section or positioning seating 21 for the passage and positioning of the threaded pin 18 and threaded knob 17.

The substantially circular seating 21 includes a lateral opening 22 to make possible the sideways release of the threaded pin 18 and threaded knob 17 and thus to enable the plate 11 to be fully opened from the frame 14.

The threaded knob 17 has a head section 17a, a shank section 17b and a through bore defining a first bore 17c and a second bore 17d having a diameter greater than the first bore. The threaded pin 18 extends through the through bore of the threaded knob 17 and is blocked at its upper internally-threaded hollow end, for instance, by a washer 23 secured by means of a bolt 24.

The washer 23 prevents full withdrawal of the threaded knob 17 from the threaded pin 18 and therefore allows only a limited opening travel of the threaded knob 17 along a predetermined axial length of the threaded pin 18.

The unscrewing of the threaded knob 17 up to the limit position determined in this case by the washer 23 allows the partial opening of the hatch 10 in the first step of outflow of the liquid from the inside of the washing machine.

In this case the lateral opening 22 has a size smaller than that of the substantially circular seating 21 of the threaded pin 18 and threaded knob 17.

The threaded knob 17 includes a coaxial and integral or solidly connected clamping ring 25, which has a width greater than that of the lateral opening 22 and prevents sideways withdrawal of the threaded pin 18 and therefore the release of the threaded knob 17 from the plate 11.

The clamping ring 25 includes a first tubular portion 25a fixed in the second bore 17d of the threaded knob 17 and a second tubular portion 25b extending from the second bore 17d. The second tubular portion 25b has a length "1" which is at least more than the sum of the length "11" of the distance travelled by the threaded knob 17 as it is unscrewed as far as the limit defined by the washer 23, and of "12", the distance travelled by the bolt 24 as it is unscrewed, plus a desired safety margin.

The presence of the clamping ring 25 of such a length ensures that the sideways release of the outwardly threaded pin 18, and therefore the complete opening of the hatch 10, is prevented until the bolt 24 is completely removed from the end of the outwardly threaded pin 18.

In fact, even if the bolt 24 is partially loosened, the length of the clamping ring 25 prevents the sideways withdrawal of the outwardly threaded pin 18, which provides an absolute guarantee against an accidental opening which inevitably ensues if the bolt 24 or washer 23 are tampered with or removed.

In the case of FIG. 2a, the clamping ring 25 is made of metal and is internally keyed to the threaded knob 17, and there is a plastic ring washer 28 to prevent the knob 17 from hitting directly against the arm 12.

Figure 2C:
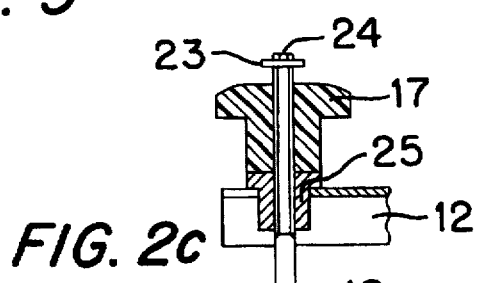

In the case of FIG. 2c, the clamping ring 25 and the ring washer 28 are formed in one piece or in a single unit, preferably of metal, which single unit is integrally connected to or made solid at the bottom of the threaded knob 17.

According to a variant the lateral opening 22 can be closed by removable closure means 26 (shown only in FIG. 1 for the sake of simplicity) such as means fitted in a slot, which have to be removed by the machine operator so as to be able to withdraw the threaded pin 18 with the threaded knob 17 laterally.

Figure 4:
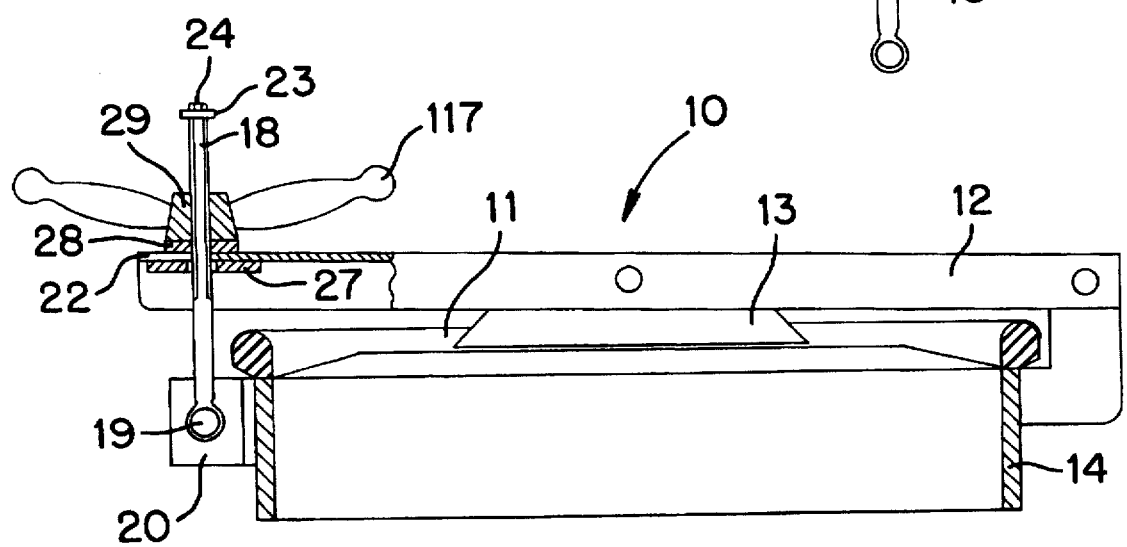
FIG. 4 shows a longitudinal section of the hatch of FIG. 3.

According to the variant shown in FIGS. 3 and 4, in which there is a knob 117 of a type with spokes as compared to the threaded knob 17, the lateral opening 22 is closed stably by a ring 27 solidly secured, for instance by riveting, to the lower side of the arm 12.

This ring 27 prevents lateral withdrawal of the threaded pin 18 and threaded knob 17 from the lateral opening 22.

According to another variant which is not shown here, the circular positioning seating 21 does not include the lateral opening 22 and is simply composed of a circular hole.

So as to be able to open fully the hatch 10, it is therefore necessary to remove the bolt 24, to unscrew the knob 117 fully and to release the knob 117 from the threaded pin 18.

It is only at this stage that it is possible to displace the arm 12 and the plate 11 associated therewith towards the opened position so as to release them from the threaded pin 18.

FIG. 4 references with 28 a washer included between a hub 29 of the knob 117 and the upper surface of the arm 12. It functions as a ring washer.

I claim:

1. A safety hatch, comprising: a plate cooperating with a frame; an arm integrally connected to the plate and having a first end and a second end, the first end being pivotally connected to the frame and the second end defining a surface portion provided with a hole comprised of a circular section communicating with a slot section which extends to an external edge of the arm, the slot section having a width smaller than a diameter of the circular section; and opening and closing means including an inwardly threaded knob having a first end defining a head section and a second end defining a shank section, a clamping member integrally connected to the shank section of the inwardly threaded knob and having a tubular portion which extends from the second end of the inwardly threaded knob and which has a diameter greater than the width of the slot section of the arm hole, an outwardly threaded pin adapted for threaded engagement with the inwardly threaded knob and having a first end pivotally connected to the frame and a second end, and limiting means provided at the second end of the outwardly threaded pin for limiting the displacement of the inwardly threaded knob along a predetermined axial length of the outwardly threaded pin, the tubular portion of the clamping member having a length greater than at least the predetermined axial length of the outwardly threaded pin.

2. A safety hatch as claimed in claim 1; wherein a ring washer is disposed between the surface portion of the arm and the inwardly threaded knob.

3. A safety hatch as claimed in claim 2; wherein the clamping member and the ring washer comprise an integral unit.

4. A safety hatch as claimed in claim 1; further comprising a closure element removably disposed in the slot section of the arm opening.

5. A safety hatch as claimed in claim 1; further comprising a closure element integrally connected in the slot section of the arm opening.

6. A safety as claimed in claim 3; wherein the clamping member and the ring washer are formed in one piece.

7. A safety as claimed in claim 1; wherein the outwardly threaded pin comprises a threaded bore at the second end thereof; and wherein the limiting means comprises a threaded bolt having a head section and a shank section for threaded engagement with the threaded bore of the outwardly threaded pin, and a washer secured by the threaded bolt to the second end of the outwardly threaded pin.

8. A safety hatch as claimed in claim 7; wherein the tubular portion of the clamping member has a length greater than at least the sum of the predetermined axial length of the outwardly threaded pin and an axial length of the shank section of the threaded bolt.

9. A safety hatch as claimed in claim 8; wherein a ring washer is disposed between the surface portion of the arm and the inwardly threaded knob.

10. A safety hatch as claimed in claim 9; wherein the clamping member and the ring washer are integral.

11. A safety hatch as claimed in claim 10; wherein the clamping member and the ring washer are formed in one piece.

12. A safety hatch as claimed in claim 8; further comprising a closure element removably disposed in the slot section of the arm opening.

13. A safety hatch as claimed in claim 8; further comprising a closure element integrally connected in the slot section of the arm opening.

14. A safety hatch safety hatch comprising: a frame; an arm having a first end and a second end, the first end being pivotally connected to the frame and the second end having a surface portion provided with a hole having a circular section communicating with a slot section which extends to an external edge of the arm; a male threaded member dimensioned to extend through the arm hole and having a first end pivotally connected to the frame and a second end; a female threaded member threadedly engageable with the male threaded member and having a head section and a shank section; a clamping member integrally connected to the shank section of the female threaded member and having a tubular portion extending from the shank section; and means for limiting the displacement of the female threaded member along a predetermined axial length of the male threaded member, the tubular portion of the clamping member having a length greater than at least the predetermined axial length of the male threaded member.

15. A safety hatch as claimed in claim 14; wherein the circular section of the arm hole is dimensioned to fit about the tubular portion of the clamping member and has a lesser dimension than the shank section of the female threaded member so that the second end of the arm may be removably connected to the frame when the female threaded member is threaded to the male threaded member to fit the tubular portion of the clamping member through the circular section of the arm hole and to bring the shank section of the female threaded member into contact with the surface portion of the arm; and wherein the slot section of the arm hole is dimensioned to enable the arm to be engaged with or completely released from the male threaded member by pivotal movement thereof relative to the frame when the female threaded member is unthreaded from the male threaded member to withdraw the tubular portion of the clamping member from the circular section of the hole.

16. A safety hatch as claimed in claim 14; wherein a ring washer is disposed between the surface portion of the arm and the female threaded member.

17. A safety hatch as claimed in claim 16; wherein the clamping member and the ring washer comprise an integral unit.

18. A safety hatch as claimed in claim 17; wherein the clamping member and the ring washer are formed in one piece.

19. A safety hatch as claimed in claim 14; further comprising a closure element removably disposed in the slot section of the arm opening.

20. A safety hatch as claimed in claim 14; further comprising a closure element integrally connected in the slot section of the arm opening.

21. A safety hatch as claimed in claim 14; wherein the male threaded member comprises a threaded bore at the second end thereof; and wherein the limiting means comprises a threaded bolt having a head section and a shank section for threaded engagement with the threaded bore of the male threaded member, and a washer secured by the threaded bolt to the second end of the male threaded member.

22. A safety hatch as claimed in claim 21; wherein the tubular portion of the clamping member has a length greater than at least the sum of the predetermined axial length of the male threaded member and an axial length of the shank section of the threaded bolt.

23. A safety hatch comprising: a frame; an arm having a first end and a second end, the first end being pivotally connected to the frame and the second end having a surface portion provided with a hole having a first section and a second section; a male threaded member dimensioned to extend through the hole of the arm and having a first end and a second end, the second end being pivotally connected to the frame; and a female threaded member threadedly engageable with the male threaded member and having a first shank portion and a second shank portion, the first section of the hole of the arm being dimensioned to fit about the first shank portion and being of a lesser dimension than the second shank portion so that the second end of the arm may be removably connected to the frame when the female threaded member is threaded to the male threaded member to fit the first shank portion through the first section of the hole and to bring the second shank portion into contact with the surface of the arm, the second section of the hole of the arm being dimensioned to enable the arm to be engaged with or released from the male threaded member by pivotal movement thereof relative to the frame when the female threaded member is unthreaded from the male threaded member to withdraw the first shank portion from the first section of the hole.

24. A safety hatch as claimed in claim 23; wherein the first section of the hole comprises a circular section; and wherein the second section of the hole comprises a slot section communicating with the circular section and extending to an external edge of the arm.

25. A safety hatch as claimed in claim 24; further comprising a closure element removably disposed in the slot section of the arm opening.

26. A safety hatch as claimed in claim 23; further comprising a closure element integrally connected in the slot section of the arm opening.

27. A safety hatch as claimed in claim 23; wherein the second shank portion of the female threaded member comprises a clamping member integrally connected to the first shank portion.

28. A safety hatch as claimed in claim 27; wherein a ring washer is disposed between the surface portion of the arm and the first shank portion of the female threaded member.

29. A safety hatch as claimed in claim 28; wherein the clamping member and the ring washer are an integral unit.

30. A safety hatch as claimed in claim 29; wherein the clamping member and the ring washer are formed in one piece.

* * * * *